Sept. 5, 1933. S. P. VAUGHN 1,925,156
METHOD OF DRIVING PROPELLERS AND ROTATIVE WING SYSTEMS
Filed Aug. 26, 1930 2 Sheets-Sheet 1
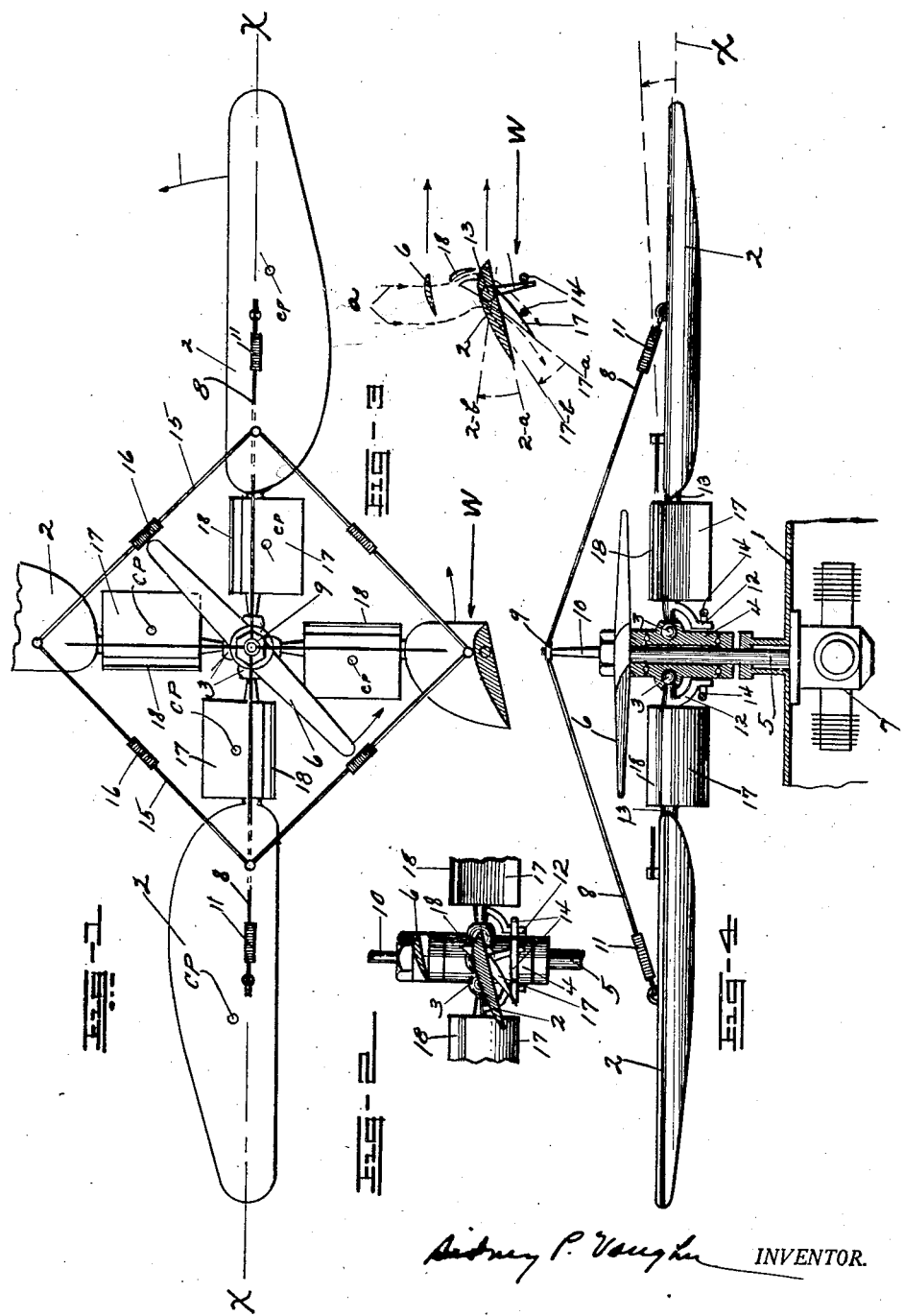

Sept. 5, 1933.    S. P. VAUGHN    1,925,156
METHOD OF DRIVING PROPELLERS AND ROTATIVE WING SYSTEMS
Filed Aug. 26, 1930    2 Sheets-Sheet 2
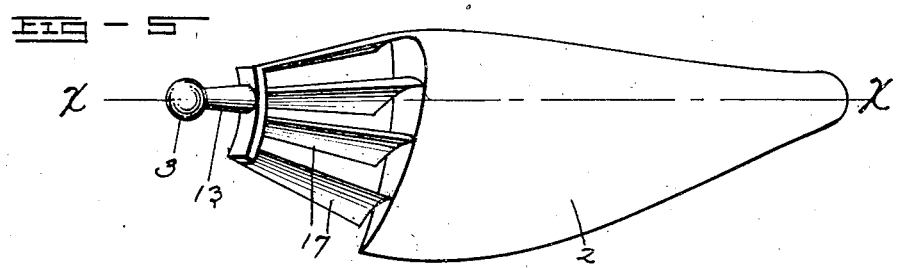
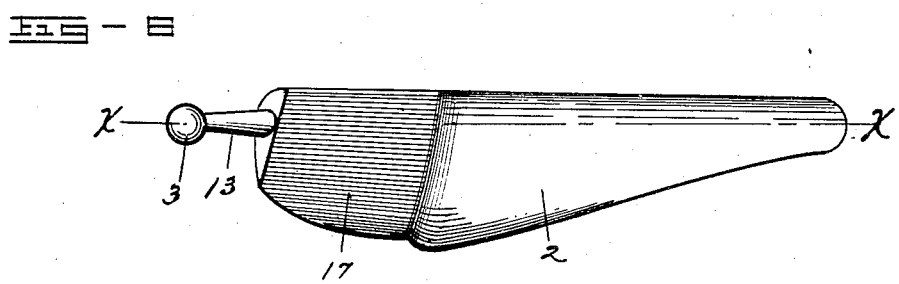
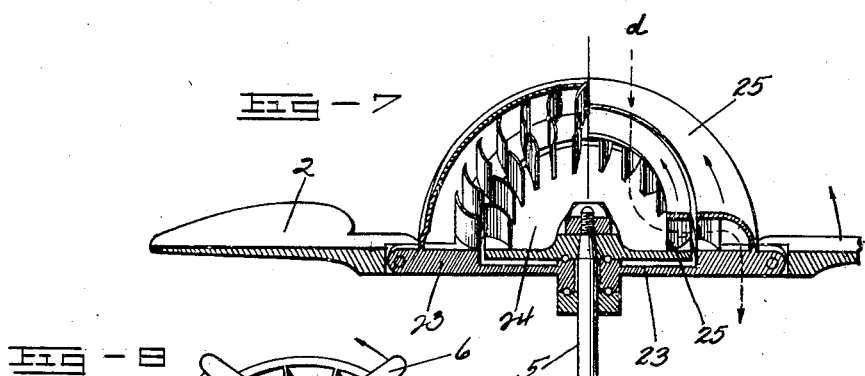
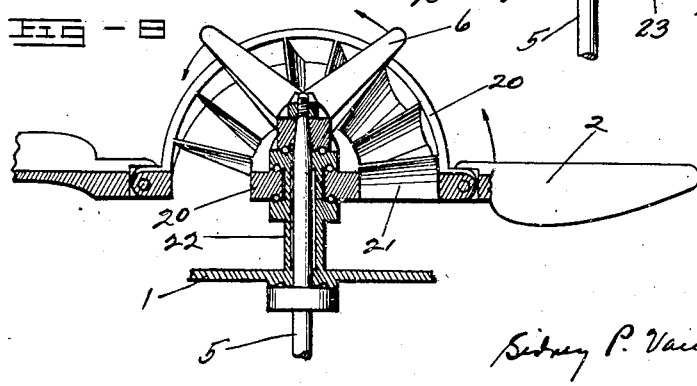
Sidney P. Vaughn  INVENTOR.

Patented Sept. 5, 1933

1,925,156

UNITED STATES PATENT OFFICE 1,925,156

METHOD OF DRIVING PROPELLERS AND ROTATIVE WING SYSTEMS

Sidney P. Vaughn, United States Navy, Ackerman, Miss.

Application August 26, 1930. Serial No. 477,842

22 Claims. (Cl. 244—19)

(Granted under the Act of March 3, 1883, as amended April 30, 1928; 370 O. G. 757)

This invention relates to a method of driving propellers and rotative wing systems, and while it is intended for air vehicles the principles may be applied in driving other types of vehicles and boats. This invention includes also a rotative hinged wing system incorporating the method of drive and which is particularly suited for sustaining aircraft of the helicopter type.

In order to simplify these specifications the term "propeller" is intended to include rotating wing systems for sustaining vehicles of the air, and propellers or air screws for propelling vehicles of the air as well as other types of vehicles and boats. The term "impeller" is intended to include blower impellers, propeller fans and centrifugal fans, for creating a blast of air.

It is well known that the larger the diameter of a propeller the greater will be the thrust per horse power developed by the prime mover driving the propeller, but in view of the high speeds of present day internal combustion engines and the future probable increase in the speeds of such engines, it is the practice to introduce a reduction gear between the propeller and the prime mover in order to obtain higher efficiencies. Even this is not satisfactory where the speed ratio between the prime mover and the propeller is very high due to the large size of the reduction gear and abnormal strains caused by unequal or sudden acceleration or deceleration of the prime mover and to varying air currents through which the aircraft flies.

The principal object of this invention is to avoid the use of heavy drive shafts, mechanical clutches, reduction gears, and belt drives in driving propellers of large diameter, by driving the propeller through the medium of what may be termed an "air clutch", which in its simplest form, comprises a windmill or air turbine connected to the propeller and an air impeller driven by a prime mover, the two being so disposed with relation to each other that an air stream produced by the impeller drives the windmill or air turbine which in turn drives the propeller. With this method of drive an impeller having a low moment of inertia may be driven at a high speed to produce a high velocity air blast to drive the windmill or turbine. Due to the elasticity of the air, any abnormal torque strains will not be transmitted from the prime mover to the propeller nor from the propeller to the prime mover.

A further object is to utilize the reaction of the air stream discharged from the windmill or air turbine described above to create a thrust in the direction of the thrust of the propeller to increase the efficiency of the "air clutch."

A further object is to make the "air clutch" very compact, light and efficient by mounting the windmill or air turbine on the same shaft or axis of the impeller and closely adjacent to the impeller, so that it will rotate freely on the impeller shaft in the air stream produced by the impeller.

A further object is to include in the structure of a propeller blade, windmill or air turbine blades to drive the propeller blades when acted upon by a high velocity air stream produced by an impeller driven by a prime mover.

Another object is to provide in a freely rotative wing system having two or more wings articulated to a common hub, and adapted to be driven by the action of an air stream on windmill or turbine blades included in the structure of the wings, means whereby the pitch of the wings, when rotating in a lateral wind, is automatically changed to equalize the thrust of all wings, and means whereby the wings attain automatically a positive pitch when a torque is applied to the rotative wing system and a negative pitch when the torque is removed so that the wing system may continue to revolve as a windmill when sustaining aircraft.

Another object is to provide a propelling system for aircraft wherein for a given torque and R. P. M. of the engine the thrust of the propeller will remain a constant as the speed of the aircraft increases, and for all altitudes when the speed of the aircraft is increased due to a decrease in the density of the air.

These and other objects and advantages as will hereinafter appear will now be described with reference to the accompanying drawings in which:—

Fig. 1 illustrates a plan view of the rotative wing system having articulated wings and shows the method of driving the wing system. Fig. 2 illustrates a sectional elevation of the hub of the rotative wing system. Fig. 3 is a sectional elevation through the wing system looking toward the hub and showing the flow of the air stream through the driving system. Fig. 4 is a sectional elevation of Fig. 1. Fig. 5 is a plan view of a modified form of rotative wing. Fig. 6 is a plan view of another modified form of rotative wing. Fig. 7 is a perspective view in section showing a preferred form of air clutch for driving propellers. Fig. 8 is a perspective view in section showing a modified form of air clutch for driving propellers.

Like numerals refer to like parts throughout the several views:

One method of driving a freely rotative hinged wing system or propeller suitable for sustaining in flight aircraft of the helicopter type is illustrated in Figs. 1, 2, 3 and 4, in which numeral 1 represents the body of a helicopter which is provided with a sustaining and propelling system comprising two or more blades 2, each of which is universally connected at its root end by a ball and socket joint 3 to a common hub 4 which rotates freely on an impeller drive shaft 5 beneath an impeller 6, attached securely to the upper end of the drive shaft 5, which is driven by a prime mover or engine 7 attached to the body of the helicopter. The ball and socket joint 3 permits each blade to articulate in any direction and to rotate around its longitudinal axis "X". The downward movement of the blades is restricted by cables 8 and springs 11 connecting the outer portion of each blade to a common ring 9 which rotates freely on a king post 10 formed by an upward extension of the drive shaft 5. The upward movement of the blade, and its rotative movement, is restricted by a depending arm 12, attached to the root end of the blade spar 13, making contact with stops 14 attached to the base of the propeller hub 4. The degree of rotation each blade is permitted to make around its longitudinal axis "X" is fixed by the difference in degrees of arc between the positive and negative pitch angles desired in the blades to produce best results. The lateral movement of each blade in its plane of rotation relative to the hub is limited by the amount of give in the cables 15 and springs 16 which connect the blades to each other in the plane of rotation. This arrangement makes the rotative wing system or propeller very flexible which is essential as will be more fully explained.

An airfoil shaped windmill or driving blade 17, suitably disposed in the air stream of the air impeller 6, is adjustably fixed to the root end of each propeller blade spar 13 with its longitudinal axis parallel to the longitudinal axis of the propeller blade 2 and its cord or driving face set at such an angle with reference to the air stream of the impeller 6 as to apply the maximum torque to each propeller blade when acted upon by an air stream produced by the impeller. Since the driving blade 17 and the propeller blade 2 are fixed to a common spar 13 both will revolve around the same longitudinal axis, and a decrease in the pitch of the propeller blade 2 with reference to the plane of rotation will cause an increase in the pitch of the driving blade 17 with reference to the air stream flow from the impeller. Conversely, an increase in the pitch of the propeller blade will cause a decrease in the pitch of the driving blade. If the center of pressure (circle c.p.) on both the propeller blade 2 and the driving blade 17 is located to the rear of their common longitudinal axis, and increase in the velocity of the impeller air stream will cause a corresponding increase in pressure on the driving blade 17 which will cause the driving blade and the propeller blade to rotate downward until the pitch of the propeller is such that the upward pressure or thrust when rotating will balance the downward pressure acting upon the driving blade. Conversely, if the upward thrust of the propeller blade is increased over the downward pressure acting upon the driving blade, the pitch of the propeller blade relative to its plane of rotation will decrease and the pitch of the driving blade relative to the flow of the air stream from the impeller will increase until both pressures balance. This feature is particularly desirable to equalize the lift on all blades when the propeller is rotating in a lateral wind. It is well known that when propeller blades are fixed to the hub and are rotating in a lateral wind, that the blade advancing into the wind will have a greater thrust than the blade receding from the wind, which is a condition not desired in a propeller adapted to sustain a helicopter if the helicopter is to remain stable.

If the propeller blades are articulated as described herein and the weights along their longitudinal axis are properly disposed, they will, during rotation of the propeller, dispose themselves along a line which is the resultant of the centrifugal, thrust, and drift forces, which will minimize the strains in the structure and results in a consequent reduction in the weight of the propeller and a further increase in its efficiency. This line will be normally about five degrees above the plane of rotation, as indicated by the dotted axial line "X" in Fig. 4.

The torque applied to each propeller blade by its driving blade may be greatly increased if the driving blade is made in the form of what is known as the slotted wing. In this invention this is accomplished by spacing a small airfoil section 18 over the leading edge of the driving blade 17 to act as an air deflector which turns the lines of air flow along the back surface of the driving blade, thus resisting the collapse of the flow which is characteristic of an airfoil without the slot at very large angles of attack. The introduction of a slot in the driving blade therefore makes it possible to increase the angle of attack of the driving blade with a consequent increase in the torque driving the propeller blade.

Should for any reason during flight, the impeller 6 stops or its speed slows to an idling speed, the downward thrust on the driving blades 17 decreases and the upward thrust on the propeller blades 2 causes the blades to attain a negative pitch immediately, in which position the propeller will continue revolving as a windmill in the air flow through the blades which will be from bottom up when the aircraft is descending.

As indicated in Fig. 3, when the air stream passes through the impeller 6 it is dragged around with the impeller blades, if of propeller form, and leaves them with a pronounced tangential motion which causes it to follow a helical path rotating in the same direction as the impeller. This rotation causes the air stream to strike the driving blades 17 at a very large angle of attack which pushes the driving blade downward and causes the propeller blade to attain a positive pitch with reference to its plane of rotation as indicated by the pitch line 2—a. The pitch of the driving blade at this time is indicated by the pitch line 17—a. When the impeller stops or slows to idling speed the downward pressure on the driving blade 17 is reduced and the upward thrust on the propeller blade, which will be rotating, and the pressure of the lateral wind, indicated by the heavy arrow "W", against the back of the driving blade, causes both blades to rotate clockwise, looking toward the hub, and the propeller blade to attain a negative pitch as indicated by the pitch line 2—b and the driving blade to attain a pitch indicated by the pitch line 17—b.

In the foregoing description the driving blade 17 has been shown as a single blade, but it will be understood that it may take any form, or, that two or more driving blades may be used to drive the propeller blade as indicated in Figs.

5 and 6. In Fig. 5 is illustrated a propeller blade 2 in which four driving blades 17 are provided in the structure of the propeller blade 2. In Fig. 6 the propeller blade 2 and the driving blade 17 are shown as a single unit with the cord face of the driving blade 17 on the same side of their common longitudinal axis "X" as the cambered back of the propeller blade.

Another type of air clutch for driving propellers is illustrated in Fig. 7, in which a multi bladed fan wheel 24 provided with radial blades of shallow depth and concave with concave surface forward in rotation, is connected to a prime mover through a drive shaft 5. A turbine wheel 23 provided with curved radial blades of shallow depth with concave surface rearward in rotation is mounted to rotate freely on the drive shaft 5, beneath the fan wheel 24, with its radial blades encircling the fan wheel blades and disposed in the tangential flow of the air stream produced by the fan wheel when rotating. In order that the energy in the air stream may be utilized to the fullest, an annular deflector 25 encircling the turbine blades is provided to deflect the air stream in a direction opposite to the thrust of the propeller blades 2 driven by the turbine. The flow of the air stream through the turbine is indicated by the dotted lines "d" and the direction of rotation of the fan wheel and the turbine is indicated by the arrows. The above arrangement makes a very compact and efficient form of "air clutch" for driving propellers of large diameter with small high speed engines where the speed ratio is so great that a reduction gear is impracticable.

Another modification of the air clutch is illustrated in Fig. 8, in which a propeller fan 6 drives a windmill 20 having curved blades 21 with the concave side so disposed as to receive the impact of the air stream produced by the propeller fan 6. The windmill in turn drives two or more propeller blades 2 hinged to an annular ring secured to the outer ends of the blades. Instead of mounting the windmill directly on the shaft of the propeller fan it may be mounted to rotate freely on a tubular member 22, connected to the body of the aircraft 1, through which passes the drive shaft 5 connecting the propeller fan 6 to the prime mover which may be located in the body of the aircraft. This type of air clutch operates in the same manner as the one illustrated in Fig. 7, in that the propeller 2 may be driven at a slow speed by a high speed engine without the use of reduction gears.

It has been shown by several investigators that for a given torque and R. P. M. the thrust of a propeller rotating in a lateral wind increases with the velocity of the lateral wind. It is this property that is utilized to the fullest throughout this invention. In the method of driving a sustaining air screw or rotating wing system as illustrated in Figs. 1, 2, 3, and 4, both the impeller and the propeller are adapted to rotate in a lateral wind. As the velocity of the lateral wind increases the thrust of the impeller and the propeller increases, which means that the mass of air passing through the impeller blades and impinging upon the driving blades of the propeller has increased which automatically increases the torque on the propeller. This together with the auto-giro effect on the propeller blades causes them to rotate much faster than they would normally rotate if there were no lateral wind. This is a very desirable feature when the propeller is used to sustain aircraft of the helicopter type where the sustaining effort should be uniform for all transitional speeds as well as for all altitudes and air densities. In other words, when the sustaining system is driven in the manner shown, that is, with an air clutch, the ratio between the upward thrust of the sustaining propeller and a given engine torque will be uniform for all transitional speeds and altitudes.

When a propeller is used to propel an airplane through the air in the manner now common, that is, with the propeller connected directly to the shaft of the engine, the thrust of the propeller decreases with the forward movement of the airplane. As a result, in order to keep the engine from racing, it is necessary to throttle down, or else increase the pitch of the propeller blades in order to keep the thrust and torque constant. Since the most efficient pitch of the blades is that which will give the highest $L_c/D_c$ for any particular section of the blade, it is evident that the pitch of the blades cannot be changed to compensate for the variations in thrust, without lowering their efficiency. In order to keep the propeller thrust a constant it is necessary that the speed of the propeller be increased in proportion to the speed of the airplane. Since the speed of the engine is limited, the only way that the speed of the propeller may be increased is by using an air clutch, such as described herein and illustrated in Fig. 7, or by using a hydraulic clutch, where the ratio between the speed of the engine and the speed of the propeller may be a variable. In using a hydraulic clutch where the speed ratio is high the efficiency of the clutch would be very low, but if an air clutch, such as illustrated in Fig. 7, the efficiency for all speed ratios would be very high due to the fact that the reaction from the air passing through the clutch is in the same direction as the thrust of the propeller. If a tractor propeller is driven by an air clutch such as is illustrated in Fig. 7, the mass of air passing through the clutch will increase with the forward speed of the airplane, causing the speed of the engine to remain a constant and the speed of the propeller to increase and its thrust to remain a constant.

With the ordinary type of airplane where the propeller is connected directly to the drive shaft of the engine, such as in use today, the resistance to forward movement decreases with altitude and a reduction in the density of the air, but, due to the fact that the speed of the engine cannot be increased beyond its designed maximum speed, nor the pitch of the propeller be increased to operate efficiently, an altitude is soon reached where the speed of the airplane cannot be increased and the lift and gravity forces balance. By using an air clutch such as that described herein and illustrated in Fig. 7, where the thrust and horsepower ratio remains a constant, the altitude that may be attained by an airplane and its speed at those altitudes will be limited only by the mechanical devices supplying the engine with oxygen and the ability of the metals in the propeller to withstand centrifugal forces.

Instead of including the clutch in the propeller structure in the manner illustrated, it may be advisable at times to place the clutch in the shaft system and entirely separated from the engine and propeller except through the drive shafts.

It will be understood that I may modify the air clutch construction in many ways without departing from the principles of the invention and the spirit of the following claims.

I claim:

1. In a rotative wing system, a shaft, a hub mounted on said shaft and freely rotatable thereon, aerofoils pivotally attached to said hub, impellers mounted between said aerofoils and said hub, a propeller secured to said shaft, a prime mover for driving said shaft and propeller thereby producing an air flow to drive said impellers to rotate the aerofoil.

2. In a rotative wing system, a shaft having bearings positioned thereon, a hub mounted between said bearings and free to rotate upon said shaft, aerofoils pivotally attached to said hub, impellers integrally connected with said aerofoils, a prime mover for driving said shaft, and a propeller secured to said shaft for directing an air stream against said impellers to rotate the airfoils.

3. In a helicopter, in combination, a body, a prime mover supported by said body, a shaft driven by said prime mover, a propeller secured to said shaft for generating an air blast, a hub free to rotate on said shaft, bearings on said hub, aerofoils pivotally connected to said hub bearings, and means for driving said aerofoils by the air blast generated by said propeller.

4. In a helicopter, in combination, a body, a prime mover supported by said body, a shaft driven by said prime mover, a propeller secured to said shaft for generating an air blast, a hub freely rotatable on said shaft, aerofoils pivotally connected to said hub, impellers supported by said aerofoils and driven by the air blast of said propeller.

5. In a helicopter, in combination, a body, a prime mover, a shaft driven by said prime mover, a propeller secured to said shaft for generating an air blast, a hub freely rotatable on said shaft, aerofoils pivotally connected to said hub, and means integral with said aerofoils and interposed between said prime mover and said propeller for driving said aerofoils by air blast from said propeller.

6. In a helicopter, in combination, a body, a prime mover supported by said body, a shaft driven by said prime mover, a propeller secured to said shaft for generating an air blast, a hub freely rotatable on said shaft, aerofoils pivotally connected to said hub, means surrounding said shaft and impellers having means thereon to direct the air flow, interposed between said prime mover and said propeller for driving the airfoils by the air blast of the propeller.

7. In a helicopter, in combination, a body, a prime mover supported by said body, a shaft driven by said prime mover, a propeller secured to said shaft for producing an air blast, a hub freely rotatable on said shaft, thrust bearings on said shaft for locating said hub, bearings on said hub, aerofoils pivotally connected to the bearings on said hub, damping means between said aerofoil and said shaft for limiting the down movement of the said aerofoils, stops carried by said aerofoils for limiting angular up movement of said aerofoils, impeller blades supported by said aerofoils for imparting rotary motion from said propeller air blast, means for varying the pitch of the aerofoils automatically due to forward translation.

8. In a helicopter, in combination, a body, a prime mover supported by said body, a shaft driven by said prime mover, a propeller secured to said shaft for producing an air blast, a hub freely rotatable on said shaft, thrust bearings on said shaft for locating said hub, bearings on said hub, aerofoils pivotally connected to the bearings on said hub, damping means between said aerofoil and said shaft for limiting the down movement of the said aerofoils, stops carried by said aerofoils for limiting angular up movement of said aerofoils, impeller blades supported by said aerofoils for imparting rotary motion from said propeller air blast, means for equalizing torque of each of said aerofoils automatically as angle of incidence of its respective blade of said impeller varies due to driving energy.

9. In a helicopter, in combination, a body, a prime mover supported by said body, a shaft driven by said prime mover, a propeller secured to said shaft for producing an air blast, a hub freely rotatable on said shaft, thrust bearings on said shaft for locating said hub, bearings on said hub, aerofoils pivotally connected to the bearings on said hub, damping means between said aerofoil and said shaft for limiting the down movement of the said airfoils, stops carried by said aerofoils for limiting angular up movement of said aerofoils, impeller blades supported by said aerofoils for imparting rotary motion from said propeller air blast, means for decreasing the angles of incidence of each of said aerofoils when advancing into the wind due to forward translation and increasing the angle of incidence of the said aerofoils while receding from the direction of forward translation.

10. In a helicopter, in combination, a body, a prime mover supported by said body, a shaft driven by said prime mover, a propeller secured to said shaft for producing an air blast, a hub freely rotatable on said shaft, thrust bearings on said shaft for locating said hub, bearings on said hub, aerofoils pivotally connected to the bearings on said hub, damping means between said aerofoil and said shaft for limiting the down movement of the said aerofoils, stops carried by said aerofoils for limiting angular up movement of said aerofoils, impeller blades supported by said aerofoils for imparting rotary motion from said propeller air blast, and means consisting of integrally mounting each of said aerofoils and impeller whereby the variance of one changes the other.

11. In a rotative wing system for aircraft, in combination, a prime mover, a shaft driven by said prime mover, a propeller secured to said shaft for generating an air blast downwardly, a support for said prime mover having a bearing for said shaft, a hub freely mounted to rotate on said shaft, aerofoils pivotally attached to said hub between said propeller and said prime mover, and impeller blades connected between said aerofoils and the pivotal connection of said aerofoil to said hub for receiving the air blast from said propeller for causing rotation of said aerofoils.

12. In a rotative wing system for aircraft, in combination, a prime mover, a shaft driven by said prime mover, a propeller secured to said shaft for generating an air blast downwardly, a support for said prime mover having a bearing for said shaft, a hub freely mounted on said shaft, aerofoils pivotally attached to said hub between said propeller and said prime mover, and impeller blades integrally connected to said aerofoils in the same horizontal plane and in line of the downward air blast of said propeller for causing the rotation of said aerofoils.

13. In a rotating wing for aircraft, a plurality of aerofoils, lifting sections outboard and air driven impeller sections inboard in horizontal alignment with said lifting sections, and means whereby each of said aerofoils is capable of oscillatory movement about their common axes of rotary motion of the aerofoils.

14. In a rotating wing for aircraft, a plurality of aerofoils, lifting sections outboard and air driven impeller sections inboard integrally connected in horizontal alignment with said lifting sections, and means for whereby each of the aerofoils is capable of oscillatory movement about their common axes during rotary motion of the aerofoils.

15. In a rotating wing for aircraft, a plurality of aerofoils having lifting sections outboard and air driven impeller sections inboard integrally connected in horizontal alignment with said lifting sections, said impeller sections composed of a plurality of small inverted slot forming aerofoil sections adapted to drive said aerofoils by a blast of air directed against the impeller sections, and means for whereby each of the aerofoils about their common axes of rotary motion of the aerofoils is capable of oscillatory movement.

16. In a rotating wing for aircraft, a plurality of aerofoils, pivotal connects inboard, lifting sections outboard, and inverted impeller sections between said pivotal connection and said lifting sections in horizontal alignment therewith, and means for whereby each of the aerofoils is capable of oscillatory movement about said pivotal connections.

17. In a rotating wing for aircraft, in combination, a plurality of aerofoils, pivotal connections inboard, an area outboard comprising lifting sections, areas inboard consisting of a plurality of small inverted slot forming aerofoil sections in horizontal alignment with and adapted to drive said area outboard by a blast of air directed from the center of rotation of the blade from above the area inboard of the blade, and means for whereby the said aerofoils is capable of oscillatory movement about said pivotal connections.

18. In a rotating lifting wing for aircraft propulsion, in combination, an area outboard of true lift section, an area inboard consisting of a plurality of inverted slot forming impeller sections integrally connected in horizontal alignment and adapted to drive said area outboard by a blast of air from above.

19. In a rotating lifting wing for aircraft propulsion, in combination, a blade having a pivotal connection inboard, an area outboard of true aerofoil lifting section, and an area inboard between the lifting section and the pivotal connection integrally connected and in horizontal alignment with the area outboard consisting of a plurality of inverted radial blades of shallow depth and concave in section and adapted to drive said blade by a blast of air directed from above said area inboard.

20. In a fan blade, in combination, an outer area having positive camber in cross section, an arm for attachment to a common hub inboard, an inner area having a plurality of inverted radial blades of shallow depth and concave in cross section in horizontal alignment with the said area outboard in juxtaposition to the center of rotation of said arm and adapted to be driven from a blast of air from above said area inboard.

21. In a fan blade, in combination, an outer area having a positive camber in cross section, an arm for attachment to a common hub inboard, an inner area having a plurality of inverted radial blades of shallow depth and concave in cross section integral with and in horizontal alignment with the said area outboard, and means above the common hub of said arm for generating an air blast upon said area inboard for imparting rotary motion to the fan blades.

22. In a rotating fan system, in combination, a plurality of blades, an outer area having a positive camber in cross section, an arm for attachment to a common hub inboard, an inner area having a plurality of radial blades of shallow depth and concave in cross section integrally formed with and in horizontal alignment with said area outboard, and a prime mover having a shaft forming a bearing for the free rotary movement of the common hub of said arm and for driving a propeller secured to the shaft of said prime mover for directing an air blast downwardly upon said inner area thereby driving the blades constituting said outer area.

SIDNEY P. VAUGHN.